(12) United States Patent
Retallick

(10) Patent No.: US 6,311,191 B1
(45) Date of Patent: Oct. 30, 2001

(54) METHOD AND APPARATUS FOR IMPROVED CONTACT AND ACTIVITY MANAGEMENT AND PLANNING

(75) Inventor: Robin M. Retallick, Emeryville, CA (US)

(73) Assignee: Appintec Corporation, Emeryville, CA (US)

(*) Notice: Subject to any disclaimer, the term of this patent is extended or adjusted under 35 U.S.C. 154(b) by 0 days.

(21) Appl. No.: 09/465,430

(22) Filed: Dec. 21, 1999

Related U.S. Application Data

(63) Continuation of application No. 08/877,681, filed on Jun. 17, 1997, now Pat. No. 6,006,215.

(51) Int. Cl.⁷ .................................................. G06F 17/00
(52) U.S. Cl. .............................. 707/104; 707/6; 707/102; 707/10
(58) Field of Search .......................... 707/2, 4, 10, 101, 707/102, 103, 104

(56) References Cited

U.S. PATENT DOCUMENTS

| | | | | |
|---|---|---|---|---|
| 5,289,531 | * | 2/1994 | Levine | 379/93.23 |
| 5,548,506 | * | 8/1996 | Srinvasan | 705/8 |
| 5,900,875 | * | 5/1999 | Haitani et al. | 345/349 |
| 5,923,848 | * | 7/1999 | Goodhand et al. | 709/219 |
| 5,930,764 | * | 7/1999 | Melchione et al. | 705/10 |
| 5,948,040 | * | 9/1999 | DeLorme et al. | 701/201 |
| 5,983,200 | * | 11/1999 | Slotznick | 705/26 |
| 6,000,665 | * | 12/1999 | Clemenston et al. | 248/18 |
| 6,006,215 | * | 12/1999 | Retallick | 707/2 |

* cited by examiner

Primary Examiner—Hosain T. Alam
Assistant Examiner—Diane Mizrahi
(74) Attorney, Agent, or Firm—H. Michael Brucker

(57) ABSTRACT

Methods and apparatus for improved contact and activity management and planning where subject data, activity data and topic data are created and functionally linked through interfaces and processing modules to organize information in a useful way that permits system users to have access to the information they need to conduct business in an efficient and productive manner.

25 Claims, 16 Drawing Sheets

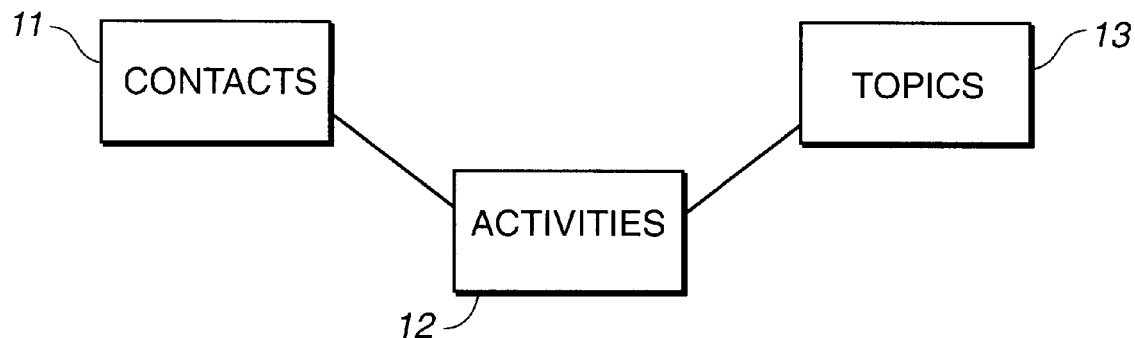
FIG._1
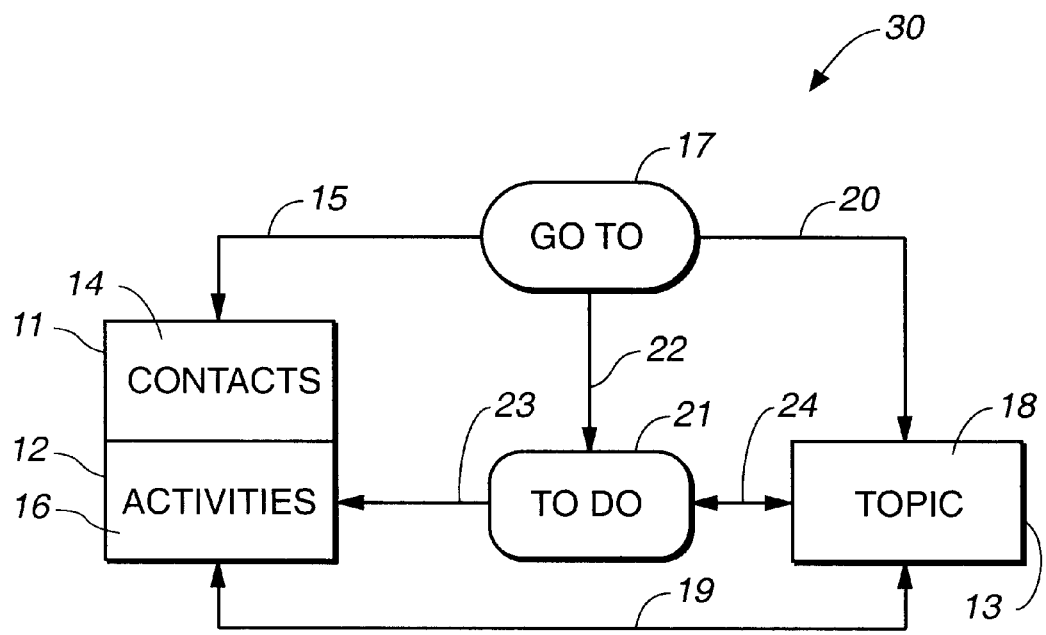
FIG._2

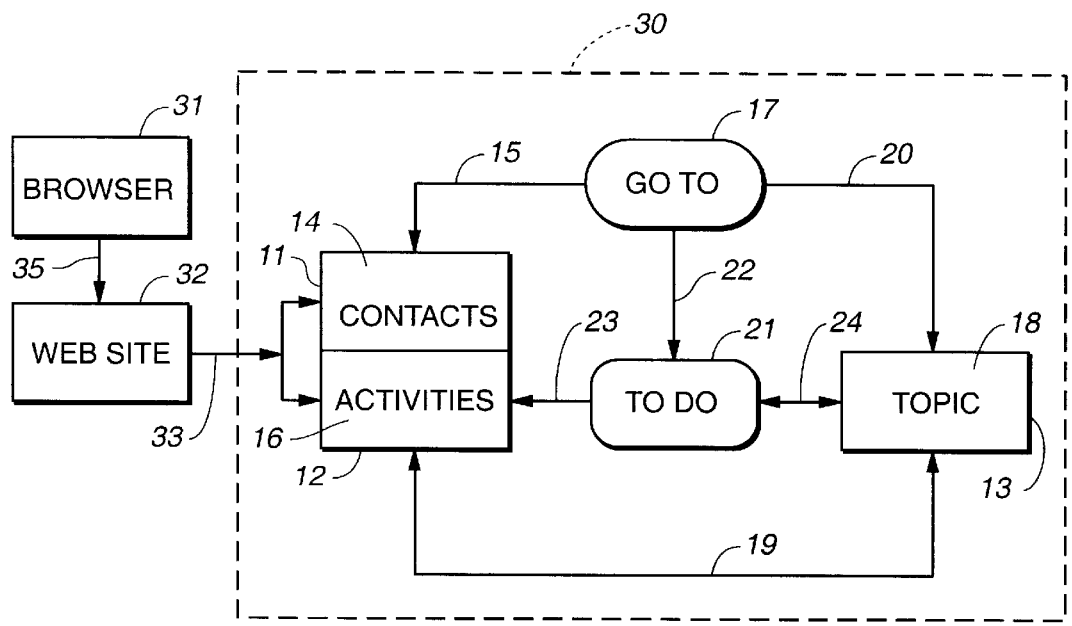
FIG._3A
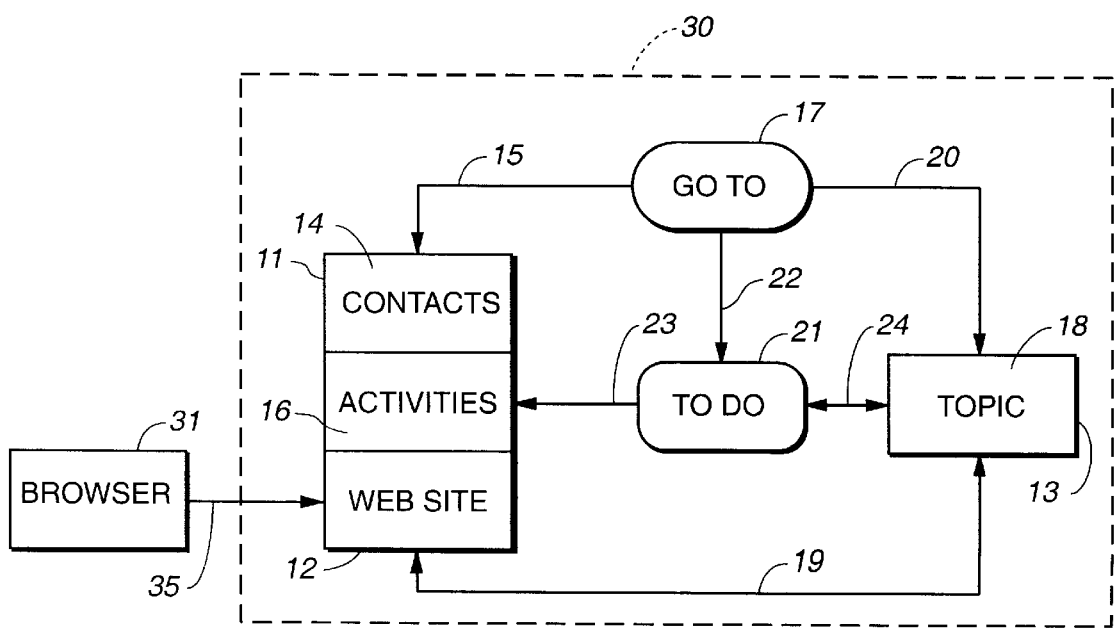
FIG._3B

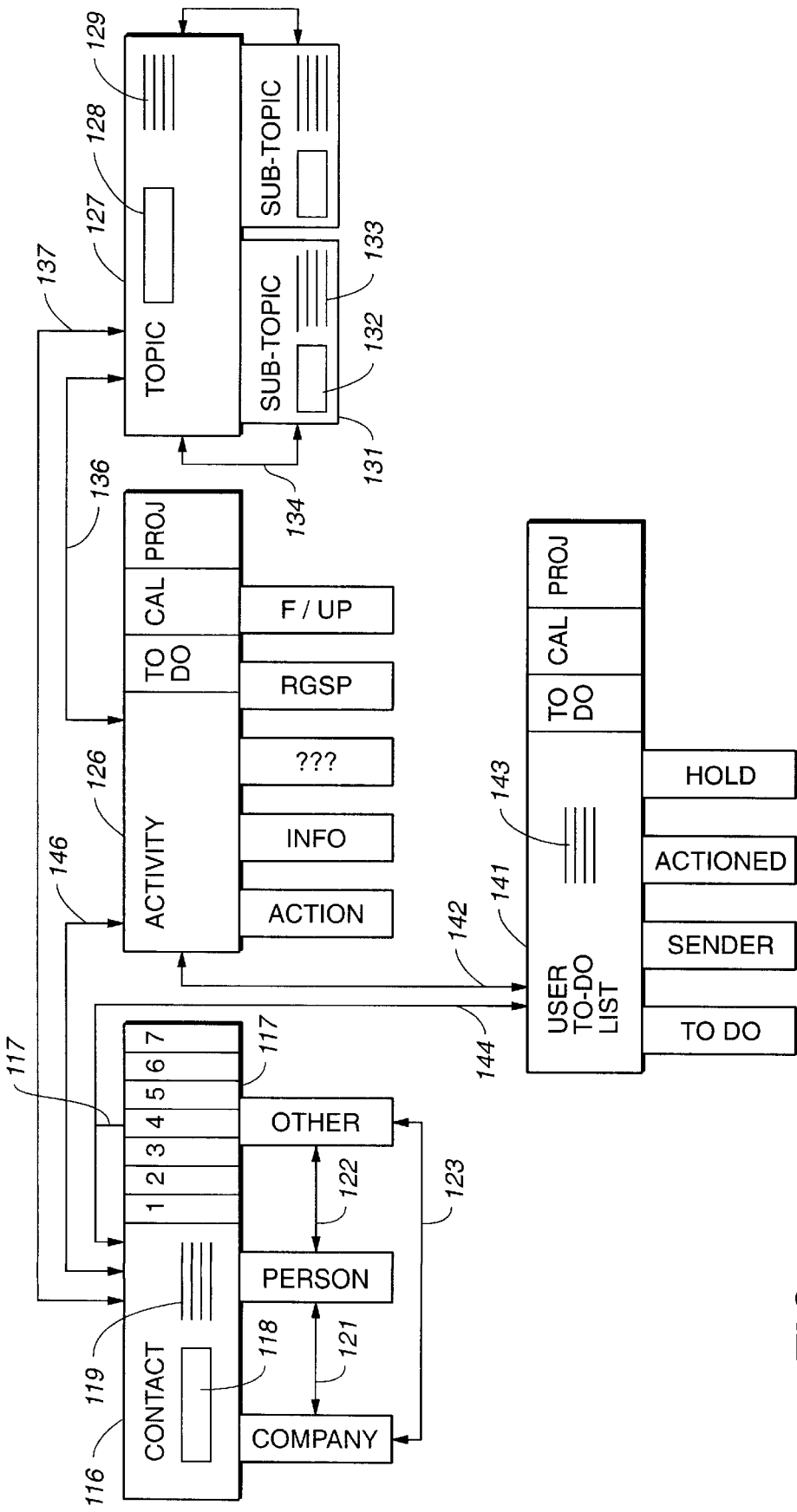
FIG._4

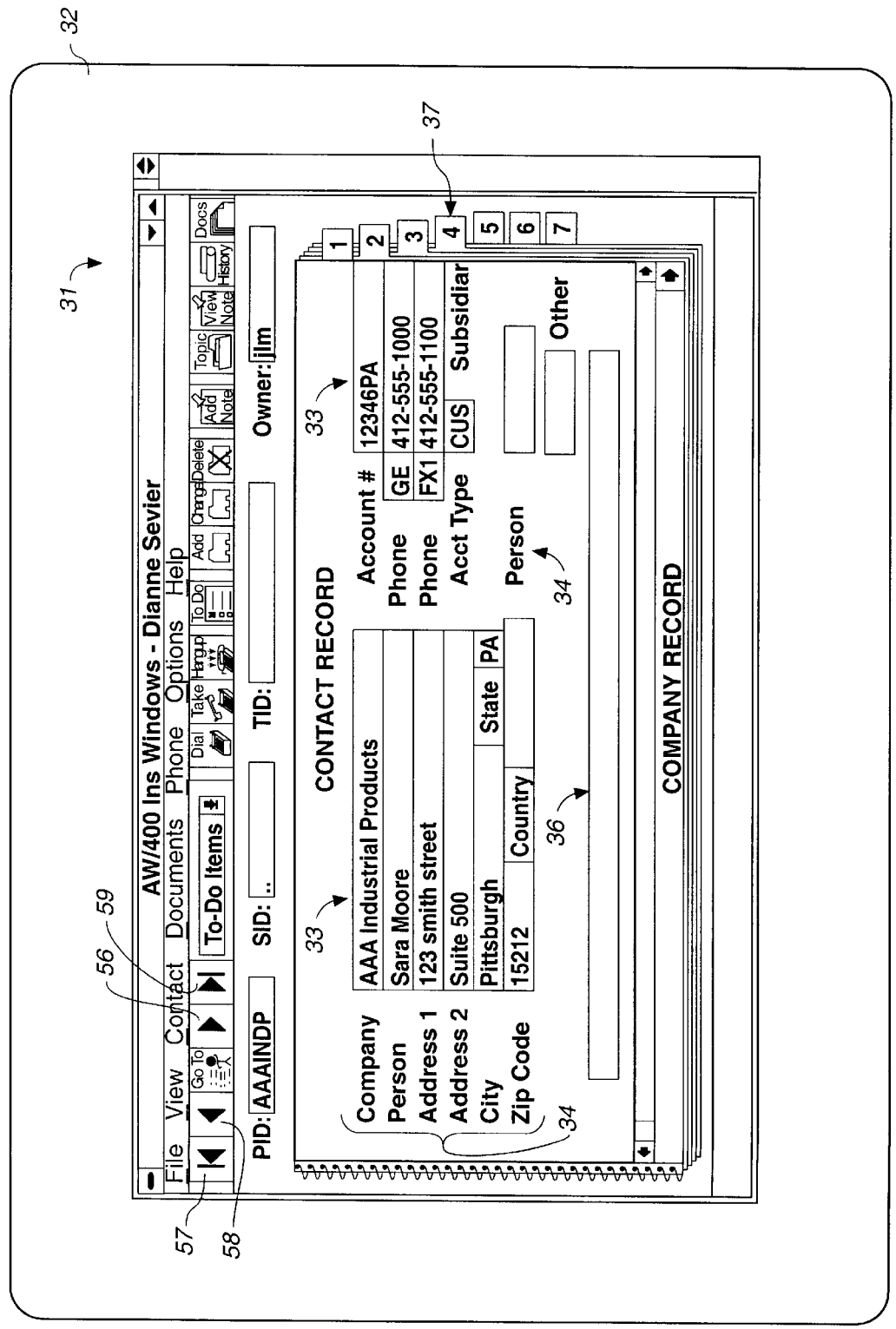
FIG._5

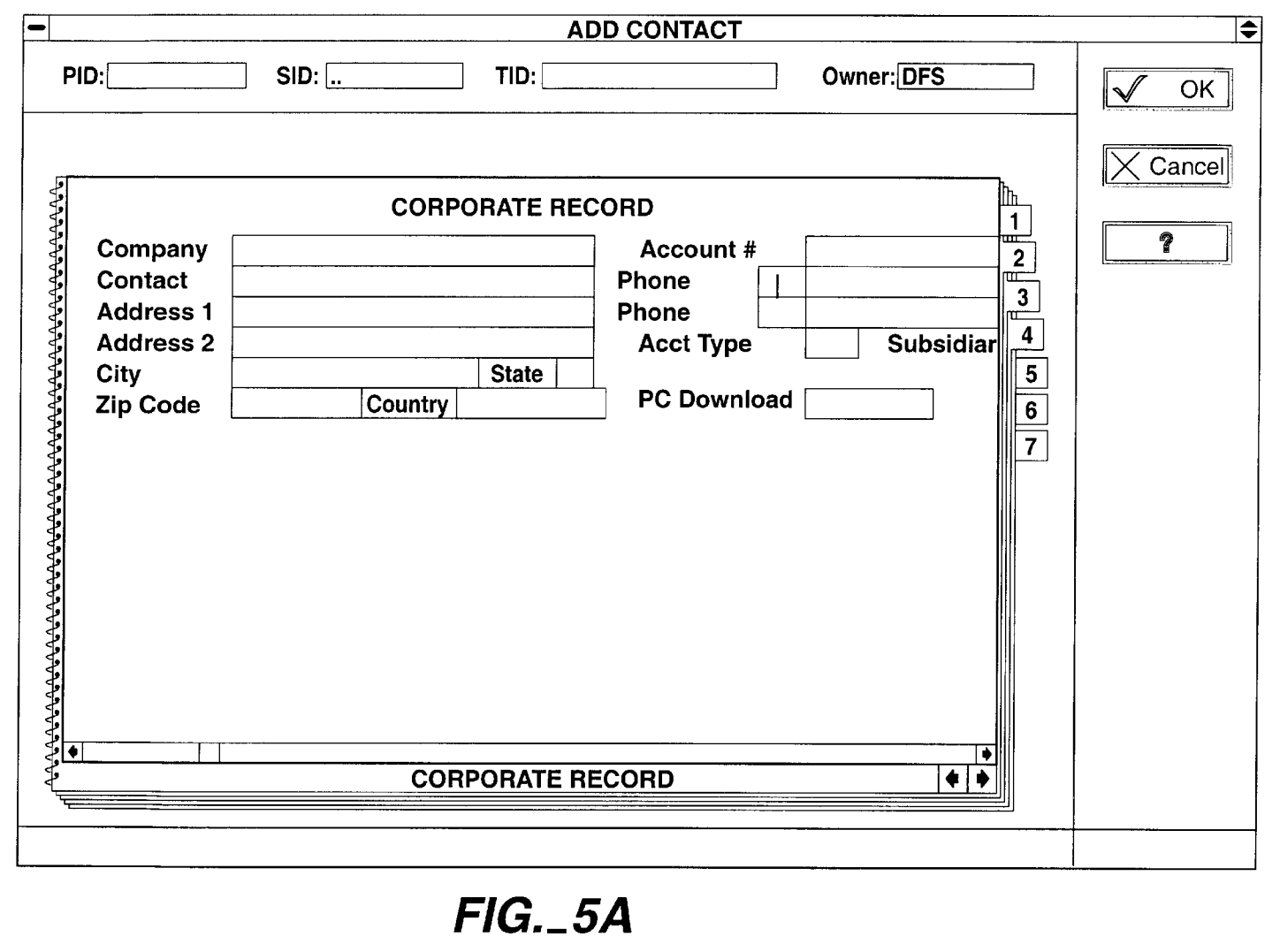

*FIG._5A*

CHANGE CONTACT

PID: ABCPUB  SID: DRAPERL  TID:  Owner: dcs

CONTACT RECORD

| | |
|---|---|
| Contact | Lisa Draper |
| Title | V.P., Marketing |
| Company | ABC Publications |
| Address 1 | 15 Sunset Street |
| Address 2 | P O Box 56477 |
| City | Boulder State CO |
| Zip Code | 80322-6806 Country USA |

| | |
|---|---|
| Account # | 12348CO |
| Dear: | Lisa |
| Phone DIR | 303-323-456 |
| BestTm2Call | MORNINGS |
| Phone GE | 303-323-444 |
| Phone FX1 | 800-323-445 |
| PC Download | |

Tabs: 1 2 3 4 5 6 7

CONTACT RECORD

FIG._5B

| | |
|---|---|
| Date: | 04/10/96 |
| Date Due: | 04/11/96 |
| Recipient: | Laura D. Hannover (LDH) |
| Sender: | Ken S. Wong (KSW) |
| Type: | Account |
| Method: | Inbound |
| Direction: | Telephone |

| | |
|---|---|
| Kind: | To Do |
| Status: | Pending |
| Priority: | A |
| Urgency: | 3 |
| Description: | BP Call |
| Related to Contact: | ABC International, Incorporate |
| Msg to Target: | N |

04/10/1996 - KSW - Laura, I talked to Julie today regarding revising our BP contract to reflect our closer relationship we have developed with them through the years. She has a couple of questions regarding the current wording of our contract, so I told her she should call you for more information.

FIG._6

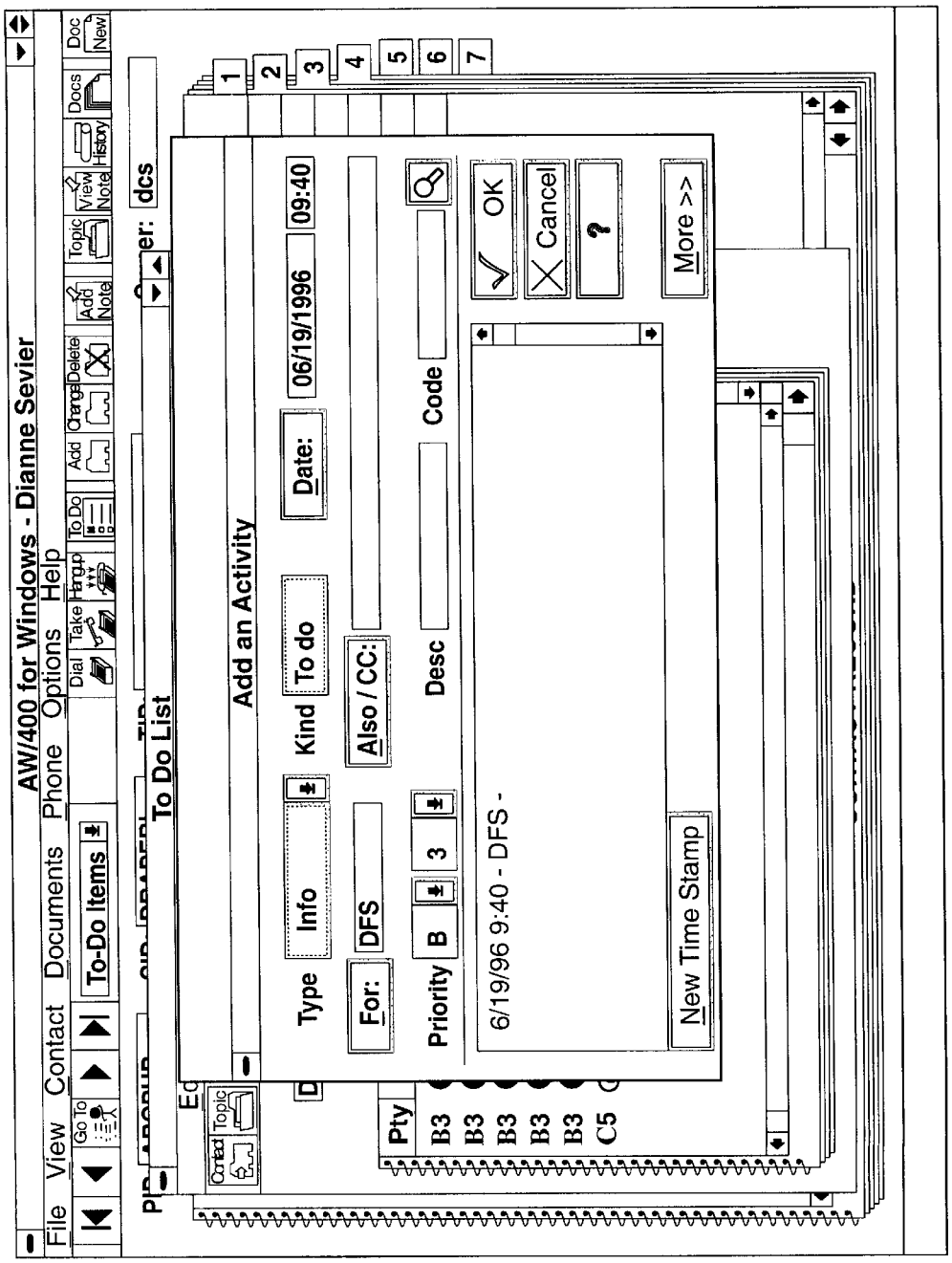
FIG._6A

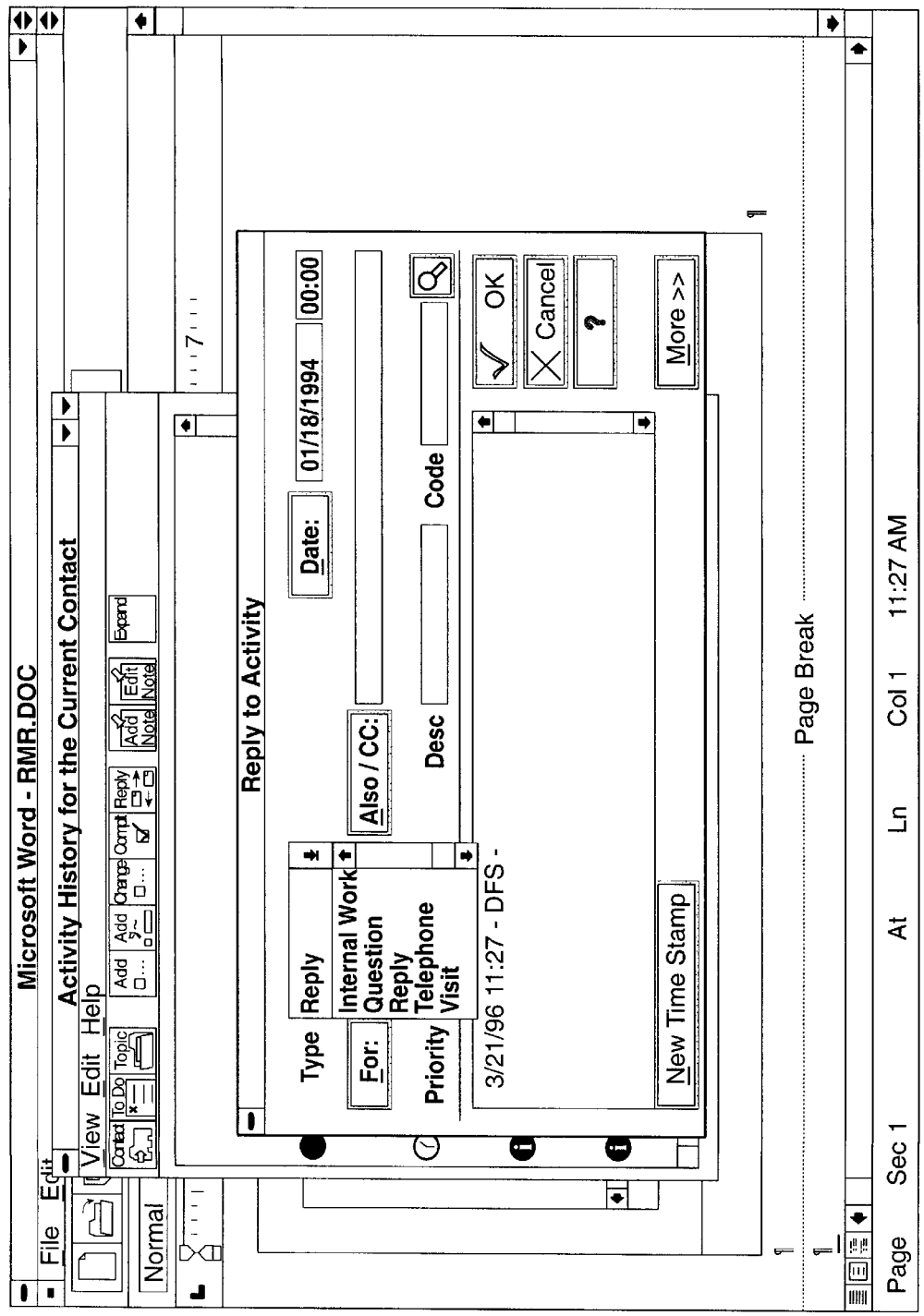
FIG._6B

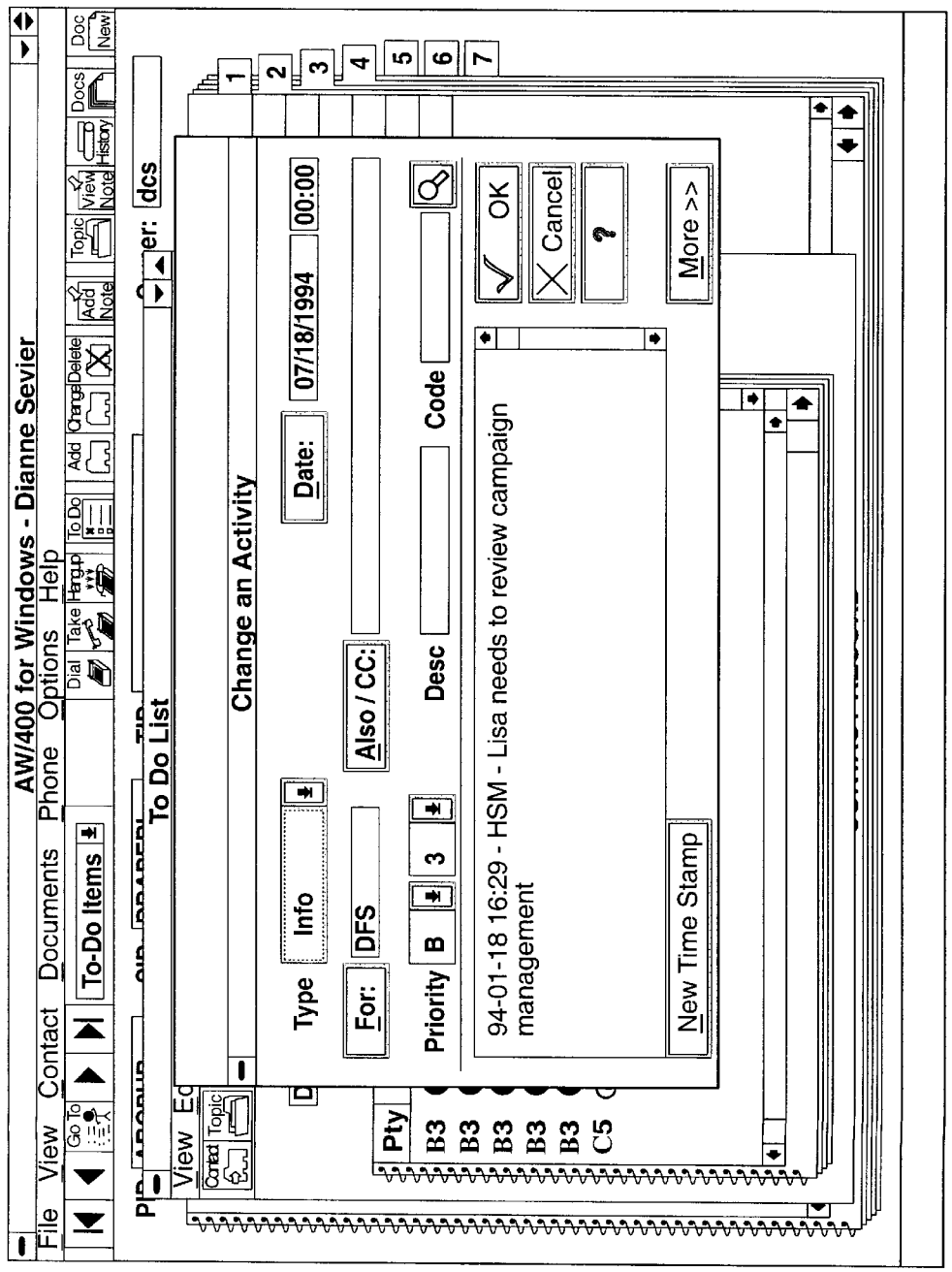
FIG._6C

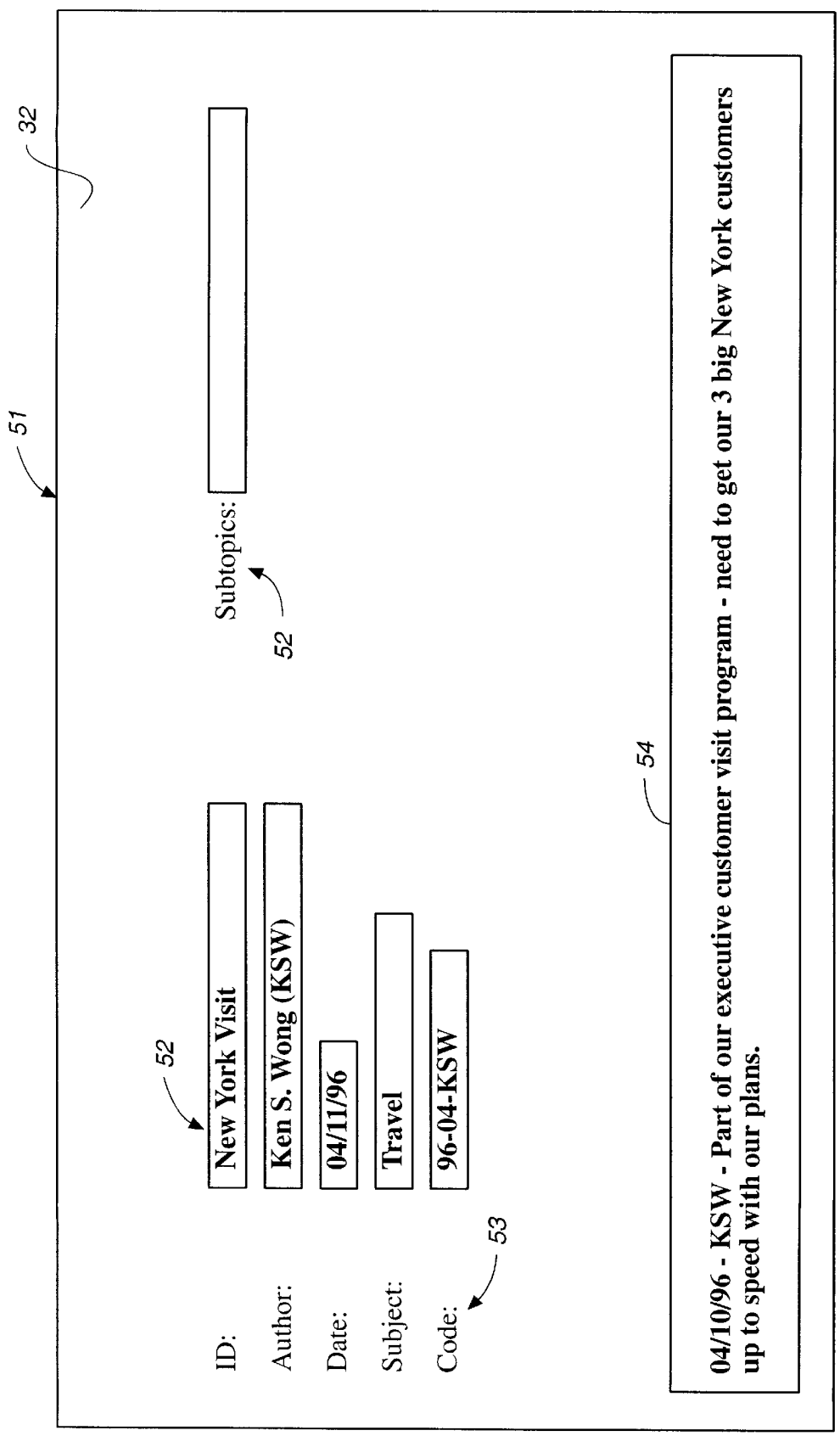
FIG._7

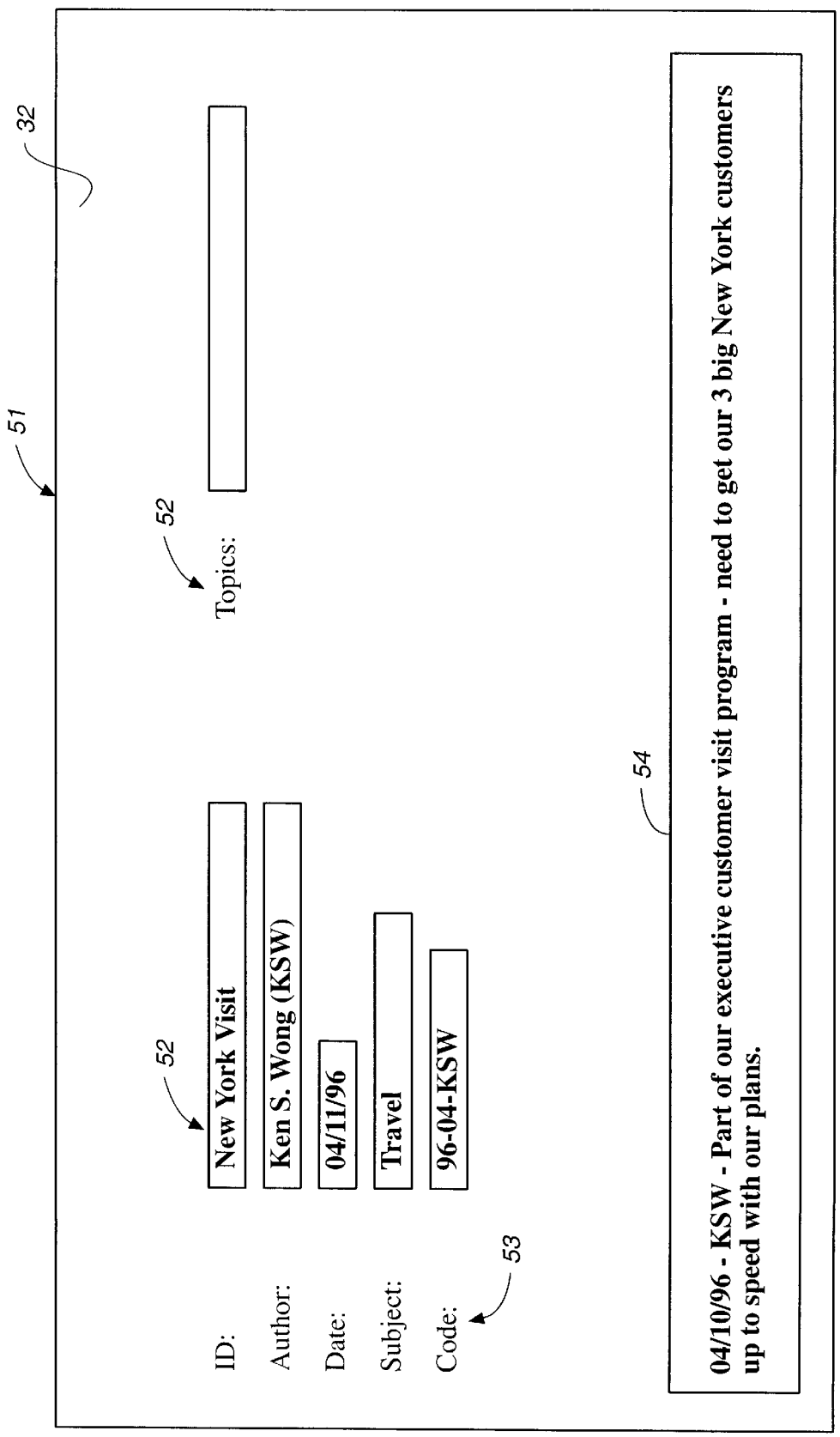
FIG._7A

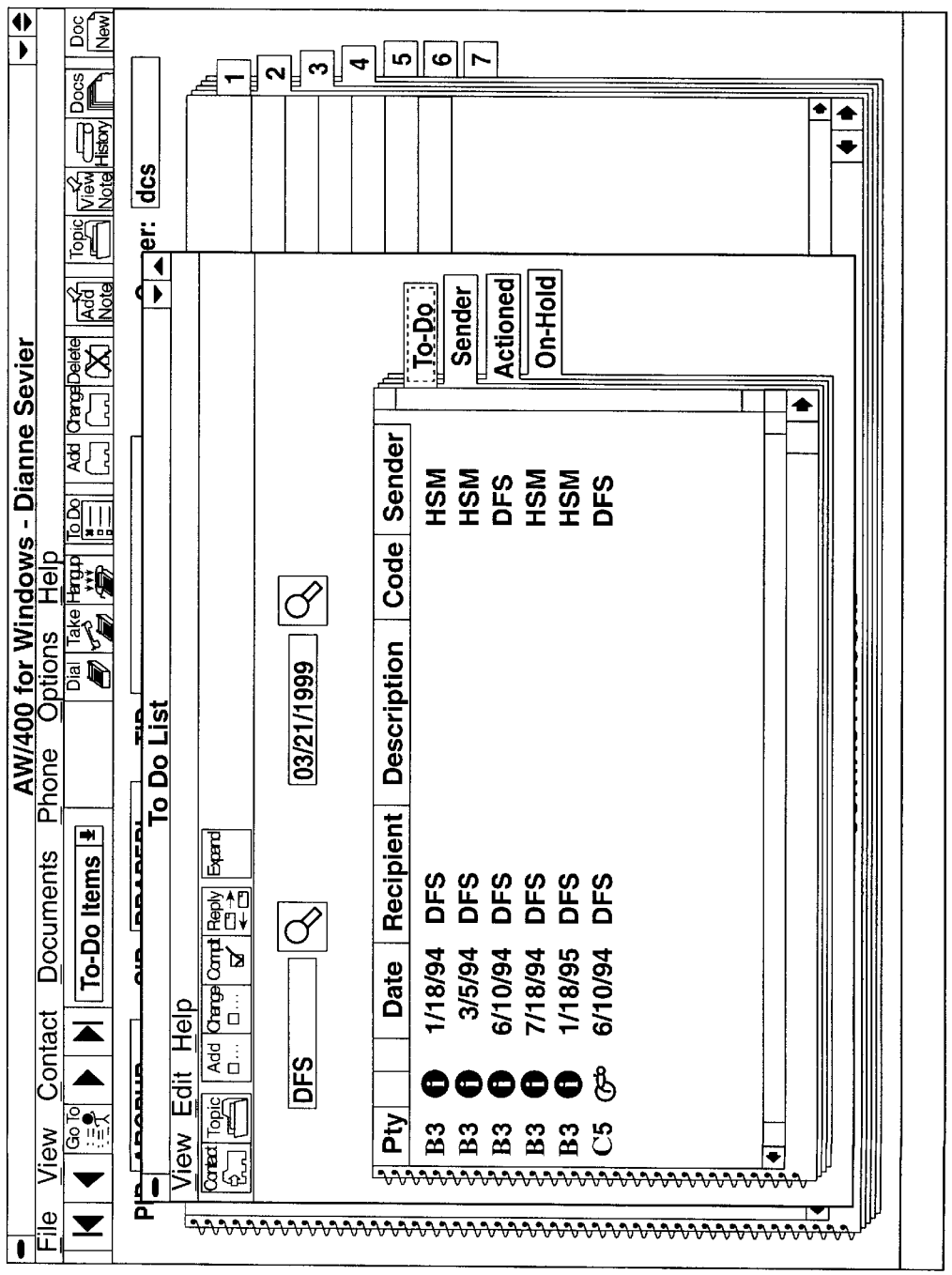
FIG._8

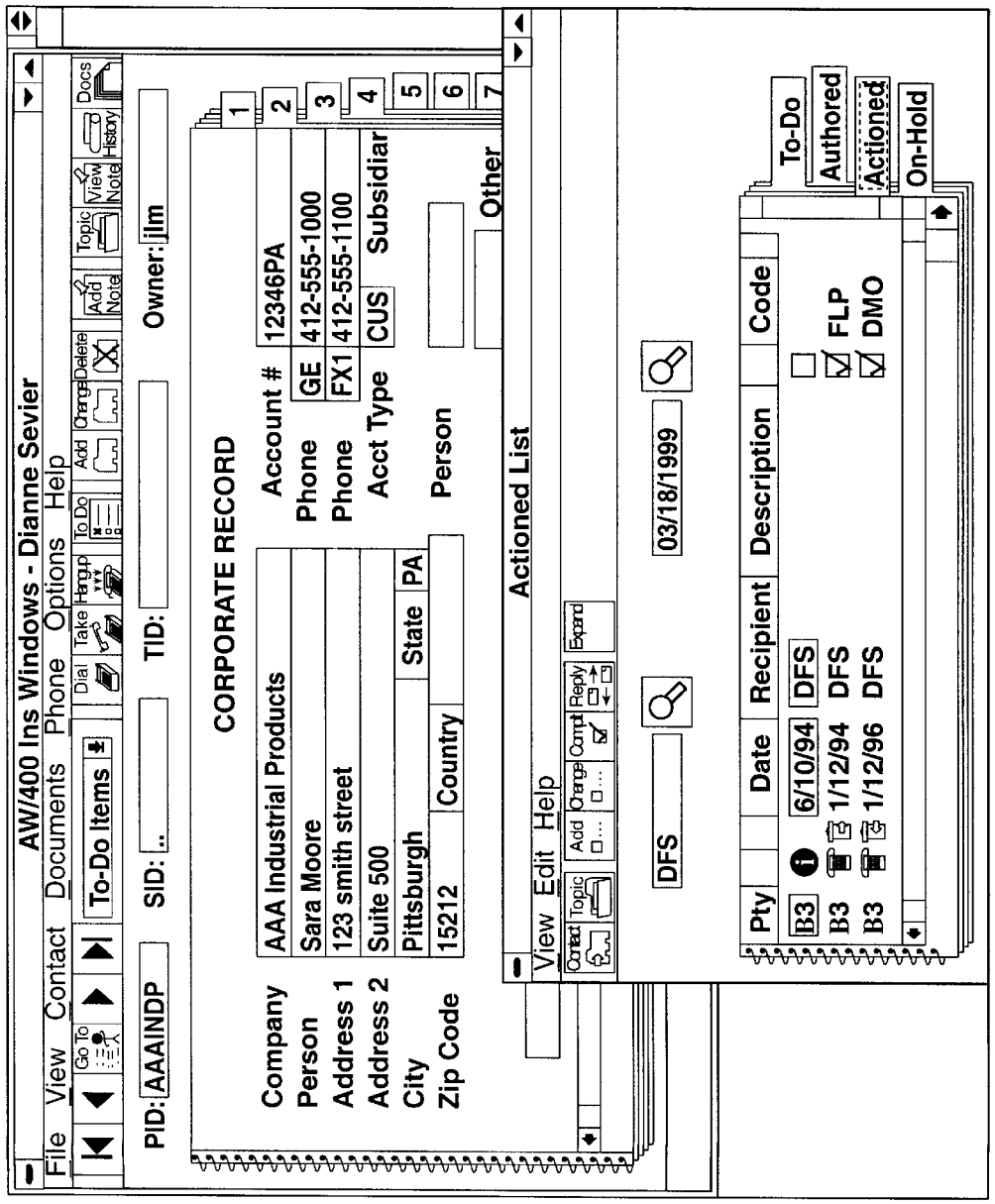
FIG._8A

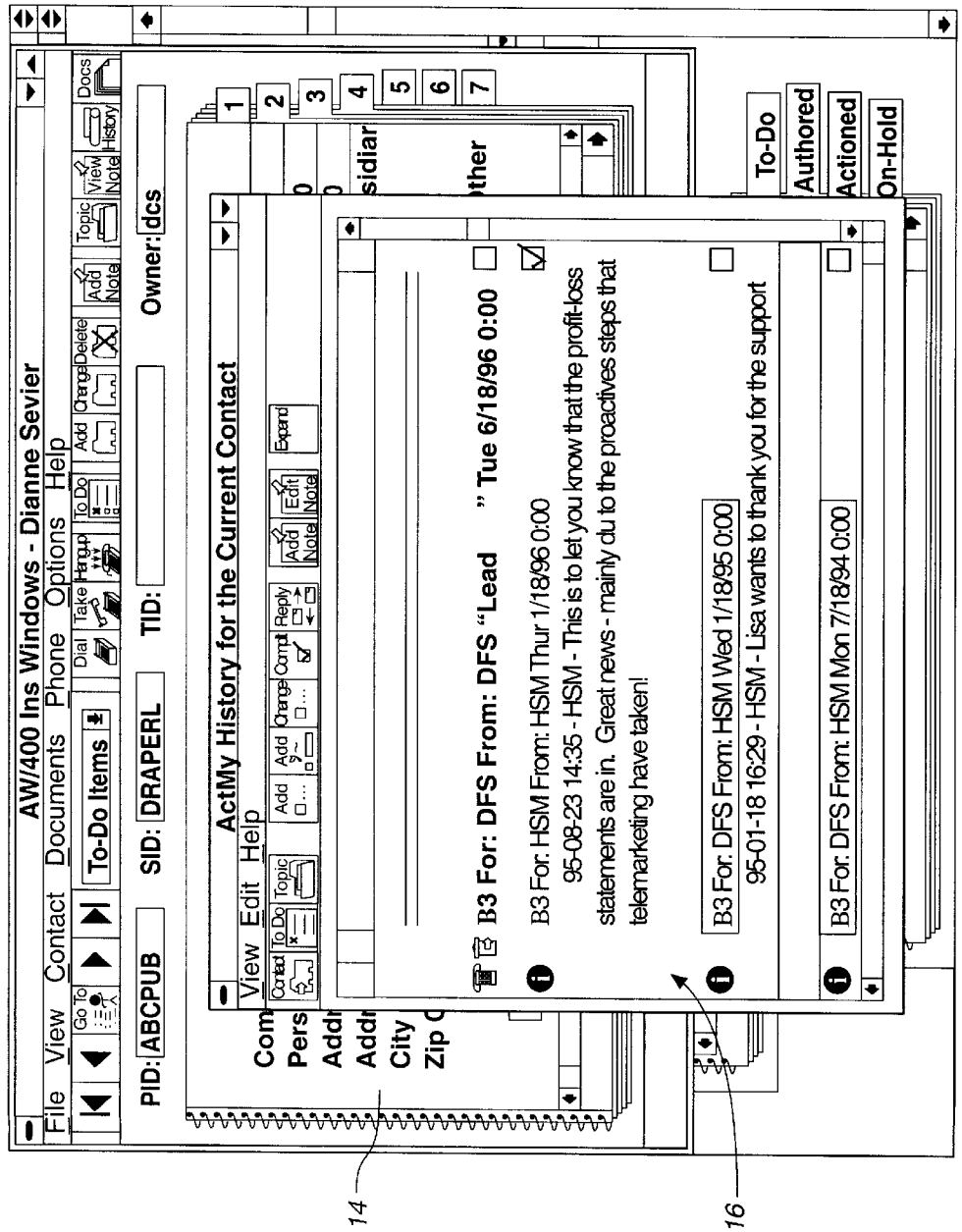
FIG._9

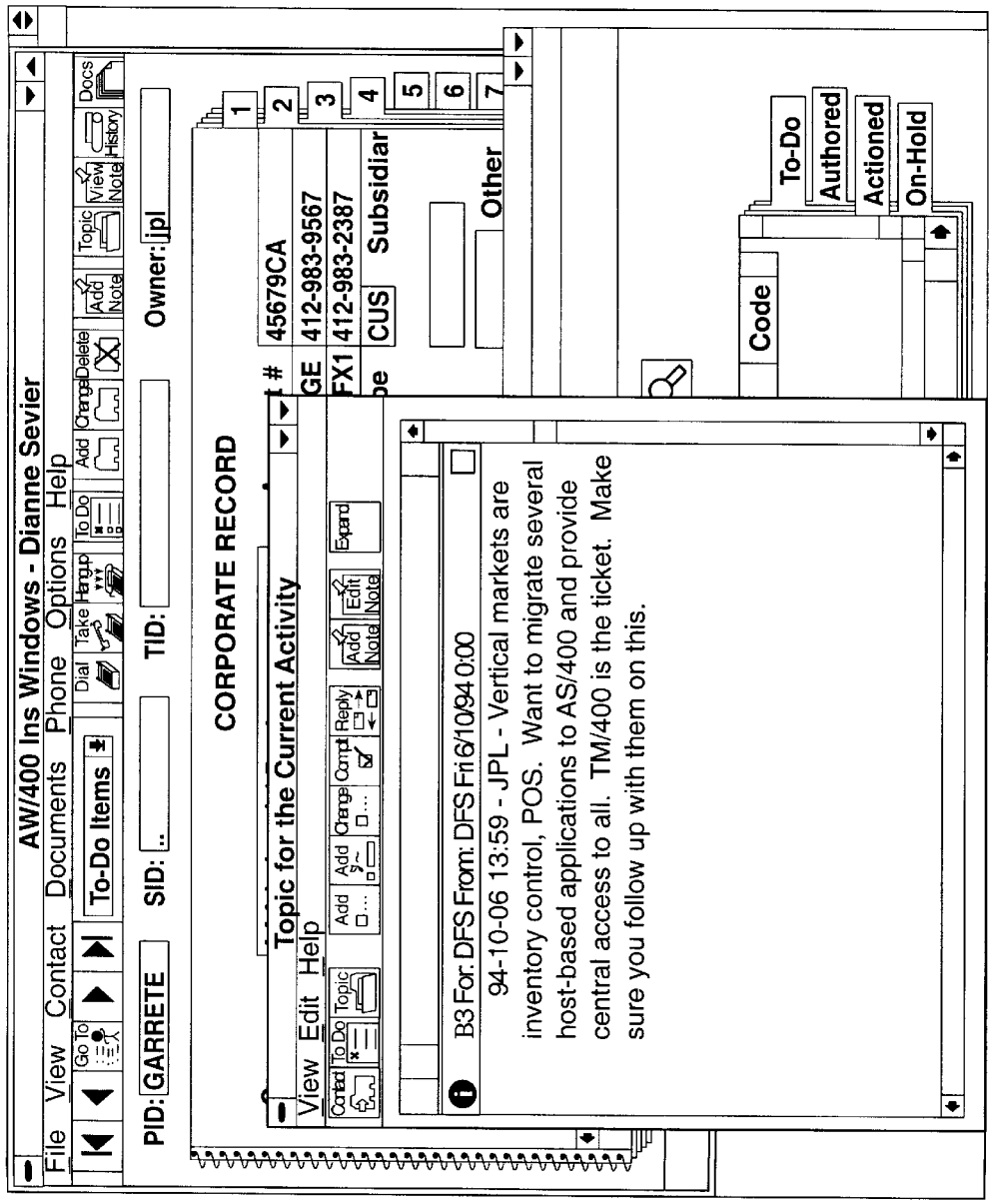
FIG._10

METHOD AND APPARATUS FOR IMPROVED CONTACT AND ACTIVITY MANAGEMENT AND PLANNING

This application is a continuation of Ser. No. 08/877681 filed Jun. 17, 1997 U.S. Pat. No. 6,006,215.

The present invention relates to computer software for aiding the execution of business activities for an individual (User) acting alone or for a group of individuals (Users) employing a plurality of networked computer terminals. In one of its embodiments, the invention is a computer-readable storage medium storing a computer program which can cause a computer to function as a contact and activity manager operating according to the instructions of the program. More particularly, the invention can be described as a computer-readable medium for causing a computer to function as a contact and activity manager wherein a computer-readable storage medium stores a computer program having an interface for accessing a database of contact records containing information about a plurality of different contacts (subjects); an interface for accessing a database of activity records containing activity information about a plurality of human-implicated activities wherein activity records are linked to a contact record, an interface for accessing a database of topic records containing topic information about a plurality of topics, each of which identifies a set of activities wherein each topic record is linked to one or more activity records; a processing module for selecting all activity records linked to a contact record; and a processing module for selecting all activity records linked to a topic record.

The invention can also be characterized as a series of operations performed by a computer under the direction of a computer program.

While the invention is advantageously utilized in business environments where the activities managed, planned and recorded are those of officers, employees, and agents of the business, the invention is not so restricted and can be used to advantage in other settings, as will become apparent to those skilled in the art as the invention is described in greater detail below. The invention will, however, for convenience, be described and explained, for the most part, with reference to its application in a business setting where multiple Users (officers, employees, agents, etc.) are functionally connected through a computer network of individual work stations and whose activities are to be integrated for better productivity and efficiency. The invention's applicability to other situations will then be obvious to those skilled in the art with little or no further explanation required.

BACKGROUND OF THE INVENTION

The basic activity management and recordation program, of which the present invention is an important improvement, is, and has been for several years, successfully marketed by Applicant under the commercial name "TeleMagic/400". The TeleMagic/400 program advanced the art by, for the first time, interconnecting a plurality of Users to allow integrated effort in a way not possible with manual systems. Unlike many "workflow" or "work management" computer programs which are computerizations of manual systems, the TeleMagic/400 program is a tool that changes the way business is conducted in a truly fundamental sense. Its benefits include greater efficiency, control and productivity. The present invention expands the capabilities of, and adds new dimensions to, the TeleMagic/400 program to the end of creating a new, different and improved product.

BRIEF DESCRIPTION OF THE INVENTION

The central concept of the present invention for the management of contacts and activities that are typically used and carried on by Users of an organization is the creation, storage and retrieval of data contained in three sets of linked data records (databases): "Contact" records; "Activity" records; and "Topic" records. As used herein, "linked" records refers to records which can be recalled from the totality of stored records as an independent and reviewable group of records. The terms "Contact", "Activity", and "Topic" are used as convenient labels to distinguish between records which contain different (but possibly overlapping) subject matter. Obviously, other labels can be used without in any way departing from the invention.

Contact records (sometimes referred to simply as Contacts) are typically customer records or project records (although they may be any other set of records to which Activities can be logically related) where, inter alia, relatively static information (names, addresses, telephone numbers, etc.) is stored. The invention will, for convenience and simplicity, be explained in relation to a set of Customer records as the Contact records, since that is typical of many businesses, but with the understanding that the invention is not so limited.

"Activity" records (sometimes referred to simply as Activities) record human-implicated (or assisted) events that have happened or are scheduled to happen in the future (such as a telephone call, a document, a fax, a scheduled visit), information to share, a question that needs to be answered, some action that has been or needs to be taken, etc.

"Topic" records (sometimes referred to simply as Topics) identity in some detail the relationship between grouped Activity records to enable the easy and quick retrieval of only those Activities relating to a particular event. When the number or subject matter of a Topic requires, "Subtopic" records (sometimes referred to simply as Subtopics) can be created which, like Topics, identify in some detail the relationship between grouped Activity records for a sub-group of Activity records all related to the same Topic. Since Topics and Subtopics are so similar, wherever Topics are mentioned herein, it is to be understood that the statement applies to Subtopics as well, unless otherwise stated.

Contact Records, Activity Records and Topic Records advantageously include two data structures: (1) data entered into named fields with a limited numbers of characters (e.g., name, address, subject matter, date, contact person, etc.) which data is, for convenience, referred to herein as "Structured" data; and (2) narrative data that can be of a free-flowing nature entered into fields of virtually unlimited space, including, for example, alpha-numeric data, graphic data, video data, voice data, etc. (e.g., "Comments", "Discussion", "Notes", recorded telephone messages, videos, etc.) which data is, for convenience, referred to herein as "Unstructured" data.

In a typical scenario, Contacts are records of customers, Activities are records of information about interactions with, and tasks to be performed for, such customers, as well as records of tasks relating to internal projects or administrative activities. Topics are logical groupings of Activities beyond their common association with a Contact and may contain Activities linked to several different Contacts, as well as Activities not linked to any Contact. Customer records typically contain Structured data of the customer's essential identifying and locating information (name, address, telephone, fax, Internet, payment terms, contact person, etc.), business activities (sales records, etc.), as well as Unstructured data that may include the background of the business done with the customer, its relationship to other customers, as well as any other information required to give a User an understanding of how to best serve the customer. Topic (and Subtopic) records, which will include both Structured and Unstructured data, permit the substance of a set of grouped Activities to be perceived without having to review the records themselves.

In the present invention, "Activity" records are typically linked with a "Contact" record, but not invariably so. While Activities typically relate to a particular customer or project (Contact record) and thus should be linked to that record (and in the preferred embodiment, will do so as a default), it is possible to have an Activity that is linked only to another Activity, or only to a Topic, or free-standing (related only, for example, to a User's calendar). In most cases, however, Activities will be linked to one Contact.

Every created Activity, Contact and Topic is stored for later retrieval. The advantage of the present invention that flows from the unique dynamic relationship of the stored data is the ability to easily and logically enter data as it is gathered and then be able to quickly retrieve from the entire body of stored data just that data required to be fully informed on a particular subject. Utilizing this basic structure, the invention is capable of managing and recording a company's internal activities and contacts with customers (including telephone contacts, fax and mail contacts, intra-company communications and tasks, etc.) and permitting recorded Activities to be recalled and reviewed by all authorized Users. By implementation and use of the present invention, Users can be quickly informed of activities that have occurred and are in process with regard to each customer or project and can, therefore, intelligently respond to a customer or co-worker on a current basis (virtually eliminating the "I'll have to get back to you" syndrome).

The particular Structured and Unstructured Data that is contained in any Contact, Topic or Activity record is a function of the particular information that the program is called upon to manage for a particular (business) entity. For every business or project to be managed, the record fields will be defined to reflect the information and activities essential to and typical of that business or project. By way of example, and for purposes of explaining the invention, the preferred embodiment will be described in connection with a business that has customers to whom goods and services are marketed, sold and supported (serviced) (such as a company that markets, sells and supports a computer program).

With Contacts, Activities and Topics as basic building blocks, a variety of useful record sets can be created, including User's ToDo lists which find their genesis in the Activity record. An Activity record can record: (1) events that are short in duration and can be done anytime within a short time span (usually one day) and, for convenience, are referred to herein as "ToDo Activities" (such as telephone calls, letters, faxes etc.); (2) events that need to be done or take place at a precise time which, for convenience, are referred to herein as "Calendar Activities" (such as meetings, conference calls, etc); and (3) tasks which are generally longer in duration (may take days, weeks or months), for which the start times and/or required end times are geared to other Activities or to ToDo Lists or Calendars which, for convenience, are referred to herein as "Project Activities".

One of the outstanding features of the present invention is the ability to link Activities and Contacts and Topics in various creative ways that provide essential information in useable forms on demand. One of the dynamic elements of the invention Is the Activity record.

To create an Activity record, a User enters Structured Data (in one of several well-known ways, such as by selecting an item from a pull-down menu or keying from a keyboard) into pre-defined fields representing essential elements of the Activity which, for the company selected as the example, could include: Due Date (for ToDo Activity); Start and Complete Date (for Project Activity); Date and Time (for Calendar Activity); Recipient (identification of the person the Activity is directed to); Sender (identification of the User initiating the Activity); Type (of Activity: Action, Info, ???, Resp, or F/Up); and Priority (A, B, C=importance/1–9= urgency). The Activity record can also include Unstructured Data—free-form notes about the Activity (to either the Sender or the Recipient). Every Activity is marked either "pending", "complete" or "on hold".

A User's ToDo list is created by the program selecting from all Activities that set of Activities with the User identified as Recipient which have not yet been marked as completed.

The defined, selectable "Type" of Activities are, in the example, limited to: Action, Info, ???, Resp, or F/Up.

An Action Activity is selected to record a past or future action, such as a telephone call, a fax, etc. One of the features of the invention is that it can be used to "anticipate" an event. For example, if, during a telephone conversation, arrangements are made for a follow-up telephone contact at a specified date in the future, an Action Activity can be created entering that future date in the Date field. That anticipated telephone call will be added to the ToDo list of the User identified in the Action Activity as the Recipient (which could, and frequently would, be the Sender). On the day specified, the call will appear on the Recipient's ToDO list, and if the call is not received, some appropriate action can then be taken as a result (e.g., call the person, send a fax, etc.). If the call does come in as scheduled, the User receiving the call will have the Activity record available, together with whatever Unstructured data it might contain relating to the anticipated call, and can quickly gather and review other Activities that are linked to its associated Contact record, as well as other Activities that might have been linked to that Activity under a Topic, and thereby be able to handle the call effectively.

An Info Activity is created to draw a User's attention to a narrative. The ??? Activity is created to pose a question that requires another User's response, and the Resp Activity is created as a response to a ??? Activity. The F/Up Activity is created when an activity does not require permanent recordation and is best extinguished from the system after it is completed.

All Activity Types created must identify a Recipient (even if it is the Sender).

An Activity requiring some action to be taken (by the User identified as "Recipient") is, when created, automatically added to the Recipients ToDo List.

Thus, every User will have, and can view, a list of the Activities that are identified for him/her (Activity or ToDo list). A User's ToDo list will typically include Activities which were initiated by other Users. The background, history and context of any Activity can be quickly retrieved for review by the Recipient charged with acting on that Activity item by: (1) calling up the Activity records linked to the Customer record with which that Activity item is identified; (2) calling up and receiving the other Activities of the same Topic(s) with which the Activity is identified and reviewing those Topic records; (3) calling up and reviewing all other Activities that have been related to that Activity (Activity records can selectively be related to each other which are not related to the same Customer record or Topic). The need to speak to another person to be informed of past and current activities regarding the customer or project involved is eliminated (as is waiting for that person to be available to talk to). The system can permit all Users to be privy to the performed, as well as the to-be-performed, Activity lists of every other User. In this way, the company is better able to "think with one mind and speak with one voice". It is also possible to restrict some of the information in the system to a limited number of Users authorized to view that data.

When a plurality of different activities are frequently triggered by some event, it is advantageous for the system to create all of the Activities automatically when the triggering event is recognized. Such a group of Activities is referred to herein as an Activity Plan and encompasses any two or more Activities that are created in response to some predetermined triggering event.

For example, if an inquiry is received regarding a particular product, an Activity Plan can be initiated after a Contact is created that includes creating an Activity requesting a Recipient to send certain described literature to the Contact, creating an Activity requesting that a Recipient call the Contact at some designated time in the future to make sure they got the literature, and creating an Activity requesting a Recipient to research the Contact prior to the scheduled follow-up call. Thus, with essentially one key stroke, three Activities are created directed to one or more Recipients for concerted action that, when recorded into the system, enables those who are asked to work on the matter to know what other Recipients have done, what other Recipients are scheduled to do, and the information they have discovered that will allow the Contact to be best served. It will be obvious to those skilled in the art that Activity Plans can be useful in a wide variety of situations and can include a large number of pre-planned Activities, depending on the circumstances.

One very practical application of the present invention and the Activity Plan concept described above is the automation of responses to inquiries received by a web site. As is typical, a web site can have a number of different selectable items indicating a variety of interests in different information available from the web site sponsor. Processing requests for particular information when a variety of different information is available is becoming an increasing problem as the number users of the internet continues to increase and the number of "hits" that a web site experiences becomes correspondingly larger. With the present invention in place, it is possible for each inquiry to a web site to generate an e-mail message to the web site sponsor containing the information of the selected items that identify the particular information of interest. This e-mail message, containing also the requester's (browser's) identification and other information, can be used to automatically create a Contact and initiate an Activity Plan predetermined for the particular selected items identified by the e-mail message. The Activity Plan would automatically send Activities to those persons in the company whose job it is to respond to the particular inquiry carried by the e-mail message, as well as set up follow-up tasks and whatever else the company does to initiate contact with a potential customer.

In the preferred embodiment, the web site would be integrated into the invention and the need for an e-mail link would be eliminated.

An important feature of the invention is that every Activity item created can be, and typically will be, automatically linked to a Contact and/or Topic record. This is accomplished by a default that requires that a Contact record be selected when an Activity record is created, whereby the newly created Activity is automatically identified with (linked to) the selected Contact record. There are occasions when it is important for certain Activity information to be attached to a Topic, even when the Activity is not associated with a particular Contact. For example, travel information for a trip associated with a sales trip to a Contact should be included in the Topic for that trip even, though the information is not associated with the Contact. In such cases, the default can be selectively overridden.

Selection of one of the Activity Types brings up a screen that includes fields for entering the elements of that Activity Type. For example, if an Action Activity is selected, a screen will appear with fields for entering Structured data identiing the date the Action is to be initiated, the person initiating the Action (Sender), the person to whom the Action is directed (Recipient), the relative priority of having the Action completed, the action to be taken, etc. For convenience, some of the fields will have default data automatically entered if no overriding data is entered. For example, the Sender default could be the person who logged onto the system at the terminal at which the Activity is being created; the Date could be the current date; etc. After the Structured data and Unstructured data are entered, the Activity is completed and the Action Activity is automatically added to the Recipient's ToDo List. All of the information entered in creating that Action Activity is stored and retrievable by any User on the network (not just the Recipient). Since all Activities will generally be linked to one or more Topics, the Activity is available to anyone having an interest in the Topic and such person would be informed that the Recipient has responsibility to perform the particular Activity on a certain date, etc.

The essential dynamic organs of the present invention are the Contact records and associated screens for creating and displaying those records, the Activity records and associated screens for creating and displaying those records, the Topic (and Subtopic) records and the screens for creating and displaying those records, and processing modules that permit the various records to be related and grouped and data from them displayed. Various other useful lists (sets of record or sets of parts of records) can be generated from the recorded data of the Activities, Contacts and Topics, such as, for example, all of the present Activities being performed (not yet completed) for a Customer; all of the Activities that have been completed for a Customer; all of the Activities assigned to and not yet completed by User "X"; as well as many others.

As described above, Activities can be related by Contact and be linked to other Activities related to different Contacts. Such related and linked Activities can be a large set of records that may be too numerous for convenient review. Within the larger set, these Activities may be capable of being divided into subsets which are logically related. These logically related subsets are organized as topics with a Topic record created to define and explain the substance of the topic. In this way, relevant records can be more easily found and retrieved for review.

The present invention can include a module for task delegation (Task Delegation module) (sending an Activity to a Recipient) that permits the Sender-Recipient link to be bidirectional. That is, when an Activity is created that establishes an Action (or other Activity Type) that requires some task to be performed or response to be made by a Recipient, that task or response is not added to that Recipient's ToDo List without limitation, restriction or pre-acceptance. Instead of the Recipient having to manually reject a task by creating another Activity to either send the task back to the Sender or to another Recipient (which the Recipient always has the option to do), the Sender will be alerted that the Recipient is unavailable (such as on vacation, or on a business trip, or not accepting new tasks, etc.). When that occurs, the Sender will have to modify the Activity in order to have it entered (a non-rejecting Recipient is a prerequisite to entering an Activity). The Task Delegation module creates a high level of sophistication by providing means by which the status of every User's workload is recorded as a Daily Activity Profile and available to be taken into account in allocating tasks. Once a database of daily Activity Profiles is created, the invention is able to monitor each User's daily workload for available time. Using this information, the invention will permit, permit with warning, reject with warning or reject outright, an Activity sent by a User (Sender) to Recipients, depending on limits established relative to the Daily Activity Profiles. Each User is able to adjust his/her Daily Activity Profile as a way of regulating his/her workload.

The embodiment of the invention that includes a Task Delegation module is capable of (a) assessing a User's daily workload and providing assistance in the management of that workload, and (b) providing a means of exchanging commitment dialog so that all Users can act in a common environment of committed action.

Accordingly, it is an object of the present invention to improve computer-based systems for assisting in the management of a business.

Another object is to improve internal and external business communications by recording and storing vital information about everyday business activities which information can be readily recalled and displayed in useful groupings.

Another object is to provide a system where, in the course of recording business activities, tasks are created that are delegated for completion to others using the system.

Still another object of the present invention is to provide a computer-readable medium for causing a computer to function as an improved contact and activity manager.

It is a further object that such contact and activity manager include accessible databases of subject records containing subject information about a plurality of subjects; activity records containing activity information about a plurality of human-assisted activities wherein each such activity record is linked to a subject record; topic records containing topic information about a plurality of topics, each of which identifies a set of activities wherein each topic record is linked to one or more activity records.

Still other objects and advantages of the present invention will become readily apparent to those skilled in this art from the following detailed description wherein I have shown and described only the preferred embodiment of the invention simply by way of illustration of the best mode contemplated by me of carrying out my invention. As will be realized, the invention is capable of modifications in various obvious respects, all without departing from the invention. Accordingly, the drawing and description are to be regarded as illustrative in nature, and not as restrictive.

BRIEF DESCRIPION OF THE DRAWINGS

The foregoing and other objects, aspects and advantages of the invention will be better understood from the following detailed description of preferred embodiments of the invention with reference to the drawings in which:

FIG. 1 is a flow diagram showing three basic database elements of the invention;

FIG. 2 is another flow diagram wherein the three basic database elements of the invention are shown with functional elements;

FIG. 3A is another flow diagram wherein the three basic database elements of the invention are shown with functional elements and a link to a web site;

FIG. 3B is another flow diagram wherein the three basic database elements of the invention are shown with functional elements and a link to a web site which is integral with the invention;

FIG. 4 is a detailed flow diagram of the basic elements of FIG. 2 and their parts, together with functional links;

FIG. 5 is a typical Contact record as it might appear displayed on a computer screen;

FIG. 5A is a screen for creating a Contact record;

FIG. 5B is a screen to change a Contact record;

FIG. 6 is a typical Activity record as it might appear displayed on a computer screen;

FIG. 6A is a screen for creating (adding) a new Activity;

FIG. 6B is a screen for replying to an Activity;

FIG. 6C is a screen to change an Activity;

FIG. 7 is a typical Topic record;

FIG. 7A is a typical a Subtopic record;

FIG. 8 is a typical ToDo list;

FIG. 8A is a typical Actioned ToDo list;

FIG. 9 is a typical Activity History for a Contact; and

FIG. 10 is a typical Topic record for the selected Contact.

DETAILED DESCRIPTION OF THE INVENTION

The definitions and labels set out above are continued and applied herein below.

The present invention relates to the creation, organization, storage, retrieval and display of digital information (data) stored as bytes in a memory device accessible for interaction by a computer. Because an explanation of the actual physical structure of the bytes within the memory is not particularly helpful to understanding the operation of the invention, it is necessary to characterize the stored data schematically and/or by functional diagrams and/or by labels, any or all of which may, and likely will, differ in appearance from how the actual data groups are stored in the memory device. Thus, it is not intended that the invention be limited by the particular labels or diagrammatic representations created to help explain the invention.

Referring to FIGS. 1 and 2, the basic elements of the invention include a Contacts database 11, an Activities database 12 and a Topics database 13, which are functionally related through processing modules and interfaces to create an improved activity management and planning system 30. The term "database" is used to indicate no more than that the information (records) identified with a particular label (Contacts, Activities or Topics) can be retrieved according to selectable criteria.

The Contact database 11 will typically contain a plurality of individual Contact records 14 as described above. A Contact record 14 is linked to all of the Activity records 16 that are identified with that particular Contact 14. Thus, selection of a particular Contact 14 for display on a computer screen, for example, will also select all of the Activities 16 for the selected Contact 14, which Activities can then be displayed in either summary listing form or in full form, if desired. An interface 15 between a GOTO function 17 and Contact database 11 permits direct access to an individual Contact (record) 14 via any identifying indicia of that Contact (name, ID number, address, etc).

The GOTO function 17 also permits direct access to a particular Topic record 18 in database 13 via interface 20. Since each Topic, as described above, groups a set of Activities, a processing module 19 exists between a Topic record 18 and Activities database 12 by which all of the Activities 16 associated with a Topic 18 can be selected and displayed again, either in summary listing form or full form.

A TODO list 21 (which, in the preferred embodiment, is a summary listing of Activities) is created by selecting from the Activities database 12, via interface 23, all uncompleted Activities 16 identified with a particular User (Sender/Recipient). The TODO list 21 is a User's primary pointer within the system and thus is made accessible, as well, through processing module 22 from GOTO 17 (such as TODO for a named User).

An interface 24 between the TODO list 21 and Topic 13 permits, in one direction, ready access to the Topic 18 with which a TODO listed Activity 16 is identified, and in the other direction, with the TODO list 21 with which a Topic 18 listed Activity 16 is identified.

Typically, a User will call up his/her TODO list 21 using GOTO 17 and display the Activities 16 scheduled for him/her for that day (as well as those from prior days still uncompleted). To look ahead at work scheduled for future dates, the date on the ToDo list is simply changed to the desired date. For any selected Activity 16 on the selected TODO list 21, the User is able to quickly put the Activity in context and gather information necessary to complete the Activity efficiently and knowledgeably—whether or not the User had previous experience with the subject matter. By processing module 23, the selected Activity 16 from the TODO list 21 can be used to select and display the Contact 14 with which the Activity is identified (linked) (Activities 16 are typically identified with a Contact 14), as well as all other Activities 16 that have been completed or remain to be completed for that Contact. Any notes in the Unstructured data portion of the Contact 14 can be reviewed and, if appropriate, added to.

Since each Activity 16 is identified with a Topic 18, the User will also have access to the information in the Topic database 13, either from the TODO list 21, the Activity database 12 or directly from the GOTO 17. The particular processing module or interface used will depend on where the User is in the system when the information is needed. For example, if, after reviewing the data in the Contact 14, the User wants to know if the Activity on his/her TODO list 21 is related to other Activities (pending or completed) that might be identified with another Contact (and thus not show up on the selected Contact via processing module 23), the Topic record 18 identified with the Activity 16 is accessed via processing module 19. The Topic 18 has a narrative (Unstructured data) that describes the subject matter about which the Activities 16 of that Topic 18 are grouped, and if further detail is needed, the Activities 16 of that Topic 18 can then be displayed. If such a displayed Activity 16 is of interest, processing module 19 permits quick access to the Contact 14 for that Activity 16, which could be different than the Contact originally reviewed via processing module 23.

As will be described in greater detail below, the available information to the User from the databases described above can include almost any conceivable form of information, including, by way of example only, documents letters, facsimile transmissions, etc.), voice data, video data, graphics and Internet links.

With a few key strokes, as illustrated above, a User has access to the available pertinent information relating to an Activity to be performed. If the available information is not sufficient to act, the User simply creates as a Sender an Activity that requests the additional information from another User (Recipient), onto whose TODO list 21 the request for the needed information immediately appears as a new Activity 16. That Recipient can quickly get "up to speed" in the same manner as described above in connection with the original User. No telephone calls are required (and waiting for their return), no meetings are necessary, and all of the information created by the transactions automatically becomes part of the record accessible by all other Users as needed. Nothing is lost and nothing is wasted.

The Topic record 18 is a critical element of the system which permits numbers of Activities to be organized for quick and meaningful review and relates Contacts through shared or connected Activities. A Topic record not only serves to group Activities, but also permits a User to quickly understand the nature and scope of the grouped Activities without having to actually review individual Activity records. The Unstructured data of a Topic record is a dynamic pointer that can be modified and added to as needed.

Referring to FIG. 3A, the system 30 can be responsive to an inquiry from a browser 38 communicating over the internet 39 with a web site 40 via an e-mail link 45. As is presently typical, the browser 38 will have to transmit certain specified identifying information to the web site 40, along with a request manifest by selecting certain selectable items available at the web site as a condition to getting the requested information. The information delivered to the web site 40 by the browser 38 can then be automatically transmitted to system 30 via e-mail link 45 in a manner well known in the art. The information transmitted over the e-mail 45 link is sufficient to create a Contact record and to initiate an Activity or an Activity Plan. In the alternative embodiment of FIG. 3B, the web site 40 can be integrated into system 30, thereby eliminating the need for the e-mail link 45 of FIG. 3A. Contacts and Activities or Activity Plans are initiated or created via function modules 45a and 45b.

Referring to FIG. 4, a Contact record 116 can advantageously have multiple formats for recording different but related information. In the example used to explain the invention, the Contact record 116 can have a "Company" format, a "Person" format and an "Other" format. The Company format records information about the company in Structured and Unstructured data formats. A Company format Contact will typically have a number of different selectable screens 117 (in the example shown, there are 7 different screens), with each screen having a grouping of different information (such as contact information, sales information, product information, unstructured data (Notes), etc.). A Person Contact format records specific information about a person in, or associated with, the Contact (company) and may or may not require multiple screens. The Other format can be used as a miscellaneous format for recording information regarding the company that does not fit well in the other formats (such as a particular project or joint venture with the company) and may or may not utilize more than one screen. The Other format may be tailored to receive specific information that is appropriate for the situation. Additional formats can be added as needed. In addition to its own Structured and Unstructured data content 118, each Contact record 16 can include or readily call up a summary listing 119 of all Activities identified with that Contact. For convenience, the listing 119 can be the subject of one of the separate screens 117 and viewable by selection of that screen. By selection of one of the summarily listed Activities on listing 119, the full Activity can be brought up onto the screen.

The presentation of a Company Contact 116 on a computer screen, will include a listing of Person Contact records identified with the Company record, permitting the full Person record to be selected for view as illustrated by function link 121. Similarly, when viewing a Person Contact record, it is possible to select the Company record with which the Person record is identified through function link 121. In the same way, function link 122 permits movement between Person Contact and Other Contact, while function link 123 permits bi-directional movement between a Company Contact and Other Contact.

Each of the Contact records (Company, Person, Other) can include Structured as well as Unstructured data and can provide a User with ready access to all of the information known about the Company, as well as the history of the business done with that Company, as revealed by the listings of Activities 19, which will also include those Activities yet to be performed.

An Activity 126 can be a record of a ToDo item, a Calendar item or a Project item (as those are defined above) and can be one of several types. In the example illustrating the invention, the Activity can be an Action, Info, ???, Resp or F/Up (as defined above). In creating an Activity 126, a screen is presented on the computer which allows selection of one of the three kinds of Activity records (ToDo, Calendar or Project) and one of the five types (Action, Info, ???, Resp or F/Up). Having made that selection, the appropriate Structured data fields are presented for data entry, along with the opportunity to add Unstructured data. It is from a full Activity record 126 that a summary record 119 is created and identified with a particular Contact 16 via link 146.

In addition to each Activity being identified with a particular Contact, each Activity is also identified with a Topic record 127. Topic records, as explained above, include Data 128 (Structured and Unstructured), which describes the common denominator of the Activities grouped within that Topic. A summary listing 129 of the grouped Activities can also be part of the Topic 127. Where appropriate, the summary listing 129 can be further subdivided into Subtopics 131, which include their own Structured and Unstructured data 132, as well as a summary listing 133 of the Activities grouped within that Subtopic. There can be multiple Subtopics 131 identified with a particular Topic 127. Part of the presentation of a Topic record 127 will include the identification of Subtopic records 131, and functional link 134 permits an identified Subtopic to be selected and fully presented. In a similar manner, a Subtopic record, when presented, will identify the Topic record with which it is identified and selection and presentation of that Topic record is made possible through the functional link 134, as well.

By selection of one of the summary Activities 129 of Topic record 127, it is possible to select and present the full Activity record through functional link (interface or processing module) 136. That same functional link 136 permits a Topic record 127 identified in an Activity record 126 to be selected and presented on the screen.

A functional link 137 between Contact 116 and Topic 127 permits a Contact identified with a selected Activity from listing 129 to be selected and presented on the screen, and also permits a Topic identified with a selected Activity from summary listing 119 to be selected and presented on the screen. The functional links 121, 122, 123, 134, 136 and 137 permit easy navigation among the various records, permitting a user to quickly and intuitively locate needed information.

A User's ToDo list 141 is created and can be presented on a screen by selection of group of Activity records 126 through functional link 142. In general, a User's ToDo list is a summary listing 143 of all pending Activities of which the User is the Recipient (as defined above). Selection of one of the Activities from summary listing 143 can bring up onto the screen the full Activity record 126 via functional link 142. A User's ToDo list 141 can be reduced to various sub-groupings for convenience and ease of use. In the example presented, the ToDo list 141 can be restricted to only ToDo items 141$a$, Calendar items 141$b$ or Project items 141$c$ (as those are defined above) within those groupings can be further subdivided into "ToDo" 141$d$, "Sender" 141$e$, "Actioned" 141$f$, and/or "Hold" 141$g$. The ToDo 141$d$ selection is, in the preferred embodiment, the default selection and lists all pending Activities identifying the User as the Recipient. The selection of Sender 141$e$ items lists all Activities in which the User is identified as the Sender. The selection of Actioned 141$f$ lists those Activities in which the User is identified as Recipient and which have been completed. The Hold 141$g$ sub-listing lists Activities which identify the User as the Recipient and which are suspended from immediate action. In the preferred embodiment, the User will be that identified person who logged onto the computer requesting the information. The identification of the User can be changed at any time to permit viewing of the ToDo list and its various sub-groupings for any User known to the system.

Whenever an Activity in summary listing 143 is selected, the Contact with which it is identified can be brought up on the screen through functional link 144. That same functional link 144 permits a User's ToDo list to be brought up on the screen from a view of the Contact record 116 (via the summary Activities 119 which identify Users as Recipients and Senders).

By selecting one of the Activities presented in summary listing 119 on Contact 116, the full Activity record can be brought up on the screen via functional link 146. Functional link 146 also permits a Contact with which an Activity is uniquely identified to be brought up on the screen from a view of the Activity record 126. Having in mind the records and their functional interrelationship as described above, the following description of specific GUI (graphical user interface) screens will be set forth to further explain and elucidate the invention.

A User utilizes the present invention by interaction with data presented on the screen of a computer monitor. As is well known in the art, there are several different styles of presenting data on a screen. DOS platformed systems are characterized by text-based presentation (green screen), which is efficient but not considered particularly user-friendly. Graphical user interfaces (GUI's) have become more the standard due to the ability to utilize them more intuitively. The present invention is not limited by the data presentation scheme employed. The TeleMagic/400 has successfully operated using a text-based presentation. The present invention will be illustrated, however, using a GUI, permitting mouse point-and-click data entry and selection, as well as keystroke operation. The particular screen layouts actually used to describe and teach the invention are for convenience and by way of example only and do not represent any limitation of the invention.

Referring to FIG. 5, a Contact record 31 (Company) displayed on a computer screen 32 includes various Structured data fields 33 identified by labels 34. Each Structured data field 33 has a particular location on the screen for entering the information called for by its associated label 34 using a limited number of letters or symbols. The number, size and labels 34 given to the fields 33 will vary as the invention is used for various specific applications. The particular arrangement (layout) of fields 33 on the screen 32 (GUI) does not form part of the invention. The invention is found in the functional relationship created to permit the easy access to, and addition of, information contained in the fields 33 and information in fields of other records, as described above, and as will further be described below.

The technique for setting the character length, location and label for a record field 33 on a screen is well-known in the art and need not be described in detail herein. Utilizing the well-known capability of creating a record screen layout, the present invention is able to display records in a way that is meaningful over a broad range of business needs.

The particular layout of Contact record 31 is an example of a Company Contact record with the fields 33 and labels 34 arranged in what a typical Company record might look like. It will be appreciated, however, that Contact record 31 could look vastly different and still be well within the scope of the present invention.

While the invention will be described with the Contact record 31 created as a Company record, a Contact record typically will be of one of several possible types. A system according to the present invention (as illustrated in FIG. 4) could have three selectable different types of Contact records, including Company records, Person records and Other (General) records. Each type of Contact record would have fields 33 and labels 34 appropriate for the particular information to be recorded on the selected record type. Each record type would include an Unstructured data area 36 for entering narrative information.

A new Contact record is created by selecting the appropriate record type (Company, Person or Other, for example) and filling in the blanks utilizing keystrokes, pull-down menus and/or defaults, all depending on the design of the GUI. Once created, a Contact record can be modified or added to as new information requires updates to older information. The Unstructured data 36 will typically be added to as interactions with the Contact.

In addition to basic identification data, a Contact record 31 can also contain more specialized data that can be selectively viewed. For convenience, the specialized data is brought up on the computer screen 32 by selecting one of the numbered tabs 37. Each tab 37 can bring up on the screen 32 a record containing information of a particular kind so it can all be viewed in one place. For example, tab "1" might be for all completed sales to that customer; tab "2" for all sales in process; tab "3" for all Unstructured data (Notes) related to that customer, etc. The number of tabs and the content of a screen selected by a tab 37 is dependent on the context in which the invention is being used and can be tailored to that context exactly. The Structured data field 33 associated with the label "Person" can be selected to reveal the names of all the individuals for whom there are Person Contact records associated with the Company Contact record. Selecting a particular individual will bring forward the Person Contact record for that person. Similarly, the Structured field 33 for the label "Other" will bring forward any Other Contact record associated with the Company Contact record.

Thus, a User is able to easily, quickly and conveniently view for any selected Company (in our example) not only its basic identification data and other relevant data that may be necessary to take action and/or communicate on a current and informed basis, but also Person Contact records relating to individuals associated with the Company. The Contact record is one of the three critical records that make up the invention.

The second of the invention's triumvirate elements is the Activity record. Referring to FIG. 6, a typical Activity record 41 displayed on computer screen 32 has Structured data fields 42 for entering information called for by associated labels 43 using a limited number of letters or symbols, and an Unstructured field 44 for entering narrative data. The number, size and labels of fields 42 will vary as the invention is used for various specific applications. Each Activity 41 records a human-assisted activity such as telephone calls, fax transmissions, letters, visit, etc. As a default, every Activity record is automatically identified with the particular Contact record selected at the time the Activity is created. Thus, that set of Activity records identified with the same Contact record will form a history of completed activities with a Company, as well as activities pending and on hold.

Some of the fields 42 can be set up to conveniently have defaults. For example, the "Date" field can default to the current date; the "Sender" field can default to the User who logged onto the computer being used; and "Related to Contact" can be the Contact selected when the Activity is created (in the preferred embodiment of the invention, an Activity can only be created after a Contact has been selected). Data can be conveniently entered in the remaining Structured fields 42 by selections from pull-down menus, as is well-known in the art.

A pull-down menu for "Recipient" (the User to whom activity is directed) could advantageously present a directory of all persons in the organization who can receive Activities. The "type" pull-down menu could list: "Action", "Info", "???", "Resp", or "F/Up" (as defined above) for selection, while the "Method" pull-down menu would permit selection of "telephone", "document", "fax", "visit" or "voice mail". The "Direction" field would toggle between "Inbound" and "Outbound" to describe the activity (telephone call inbound, for example). Similarly, "Status" could be a pull-down menu with the choices of "Pending", "Completed" or "Hold", as appropriate. The "Kind" menu would offer the choice of "ToDo", "Calendar", or "Project". Thus an Activity can be quickly created with a few keystrokes and the choice from a few menus.

The Unstructured field 44 permits vital but largely unpredictable information to be recorded and provides context and perspective to the Activity where necessary or desirable.

All of the forgoing is by way of example only, with the understanding that other methods of data presentation and input are possible, as are other, different and additional data. The invention resides primarily in the ability to immediately access and easily and intuitively navigate between Activity data, Contact data and Topic data, and to extract from that data the most needed and relevant information (including Unstructured data, as well as Structured data) for a particular inquiry.

Referring to FIG. 7, a typical Topic record 51 as displayed on a computer screen 32 has Structured data fields 52 for entering information called for by associated labels 53 using a limited number of letters or symbols, and an Unstructured field 54 for entering narrative data. The number, size and labels of fields 52 will vary as the invention is used for various specific applications. As with the other records described above, it is advantageous to have some of the fields filled by default and others by toggle or pull-down menus. One of the vital functions played by the Topic record is to describe in terms understandable to those using the system the criteria for an Activity being identified with that Topic. For that purpose, the Unstructured data in field 54 plays an important role. By reviewing only a few Topic records, a User can quickly determine where, among hundreds (or more) of Activities, he/she is most likely to find the particular information sought. By selecting the data field 52 identified by label "Subtopic", all Subtopic records of that Topic are revealed.

Referring again to FIG. 5, Contacts are advantageously displayed in a GUI having banner pull-down menus and selectable function icons. Some of the icons initiate standard database functions (e.g., go to next record, 56; go to first record, 57; go to previous record, 58; go to last record, 59, etc.), and some are designed especially to expeditiously carry out the functions of the present invention.

Three telephone icons, "Dial", "Take" and "Hang Up", permit a selected telephone number to be automatically dialed, an incoming call to be answered, and a telephone call to be disconnected, all with a simple point-and-click (all computer functions well-known in the art).

Three record icons, "Add", "Change" and "Delete", provide convenient click-and-point ability to add, change or delete a record (a common database feature).

Referring to FIG. 8, in addition to FIG. 5, a point-and-click on the "ToDo" icon of Contact 31 brings onto the screen (FIG. 8) a summary listing of the pending Activities identifying the User as "Recipient". The TODO list screen is advantageously arranged with tabs that allow logical groupings of summary listings of Activities to be presented on the screen at once. For example, selecting the "ToDo" tab (as shown) presents all pending Activities for the User ("Recipient"); selecting the "Sender" tab brings up all Activities initiated by the User as "Sender"; selecting the "Actioned" tab groups and presents all Activities of the User as "Recipient" that have been completed (as shown in FIG. 8A); while selecting the "On-Hold" tab would reveal those activities of the User or Recipient which are uncompleted (pending) but for which no action is presently required. Other groupings and associated tabs could be appropriate for different uses of the invention and the invention is not to be limited by the particular examples used herein to explain the invention.

All groups of summary listings of Activities (ToDo lists, Histories, etc.) are displayed on the screen with an accompanying set of selectable icons: "Contact", "Topic", "Add", "Change", "Complt", "Reply" and "Expand". (See FIGS. 5, 6A, 8, 8A, for example.) For any selected Activity shown on a list of Activities (such as on any of the ToDo listings (tabs 1–7)), the selection of "Contact" will bring onto the screen the Contact with which the selected Activity is uniquely identified (see FIG. 5); the selection of "Topic" will bring onto the screen the Topic with which the Activity is identified (see FIG. 7); the selection of "Add" will bring up a screen that permits a new Activity to be created (see FIG. 6A); the selection of "Change" will bring up a screen that allows Activity data to be changed (see FIG. 6C); selection of "Complt" will mark the Activity as completed (see FIG. 8A); the selection of "Reply" will bring up a screen that permits a reply to be easily made to the selected Activity (see FIG. 6B). "Expand" is available if there are additional choices to present to the User.

If the User wants to know more about one of the Activities listed on the "Actioned" list of FIG. 8A, such as, for example, the second item (a priority B3 outgoing telephone call made on Jan. 12, 1996 to DFS), the User need only double-click on the screen listing of that Activity to bring to the screen the full record of the Activity (see FIG. 6), including any narrative notes.

It is helpful to have the Contact in the background of any Activity listing (see FIG. 8A) to remind the User of the Contact with which the Activities being viewed are identified. It also makes it easy to bring that Contact record to the active part of the screen by simply clicling on any viewable part of the screen occupied by the Contact record (a well-known and often used navigation technique).

Referring again to FIG. 5 in the Contact mode, selecting "Add" from the banner brings up a screen for adding a new Contact record (see FIG. 5A); selecting "Change" brings up a screen that permits a change to be made to the Contact (see FIG. 5B); selecting "Delete" permits the entire Contact record to be deleted from the database; selecting the "Add Note" icon brings up a screen (not shown) that permits a note (Unstructured data) to be added to the Contact 36; selecting the "View Note" icon brings to the screen all of the notes in the Unstructured data field 36 for the selected Contact (which could be equivalent to selecting one of tabs 37 (see FIG. 5)); selecting the "History" icon brings onto the screen a summary listing of all of the Activities 16 identified with that Contact 14, including those completed (checked square), as well those still pending (unchecked square), as illustrated in FIG. 9. Selecting the "Topic" icon brings to the screen the Topic for the selected Activity, together with the Activities identified with that Topic (see FIG. 10). The "Docs" icon, when selected, identifies and presents on the screen a listing of all of the documents that have been identified with the current Contact.

By selecting the "ToDo Items" icon, a User is able to select predetermined groupings of Activities.

The banner pull-down menu items "File", "View", "Contact", "Documents", "Phone", "Options", and "Help" shown on FIG. 5 provide an alternative method of achieving the same results as pointing and clicking on one of the icons described above. Additional functions are also possible using the pull-down menus, as are to be expected for routine operations of a database, and therefore need not be described herein.

Referring to FIGS. 7 and 7A, a Subtopic record 51a differs from a Topic record 51 by the inclusion of a Structured data field 52a labeled "Topic" which directs the User to the Topic of which the Subtopic is a sub-topic. A Topic record 51 differs from a Subtopic record 51a by the inclusion of a Structured data field 52 labeled "Subtopics" which, when showing data, alerts the User to the fact that the Topic is further refined into one or more Subtopics Contact records, Activity records and Topic records form the data pool from which a wide variety of useful information can be selected and presented to a User for quick and accurate action. The present invention "sits on top of" a database program such as IBM's DB2/400 which permits the various record fields of the present invention to be sorted and reported in ways limited only by the creativity of the User and the power of the underlying database program. All of the screens discussed above with reference to the particular example being used to describe and explain the invention are well within the computing power of several commercial database programs currently on the market, as is well-known to those skilled in the art.

Up-to-date User ToDo Lists are obtained from Activity records and are the organizational foundation of a User's day-to-day working agenda. Each task described in an Activity is identified with a single Recipient. All of the uncompleted Activity-described tasks identifying the same Recipient form a task list for that Recipient. When presented by due dates, these uncompleted tasks form a ToDo list that a User employs each day as a starting point for organizing and prioritizing his or her work. Because it also can be useful, a list of completed Activity-ordered tasks can also be created. In addition, a combination of completed and uncompleted tasks within a certain time frame can also be created.

The Sender of an Activity naming another User as the Recipient often has a need to know if the described task has been completed. A list of all of the Activities by the same Recipient that describe tasks that have not yet been completed (Recipient Activity List) is one of the lists created by the present invention. By viewing his or her own Recipient Activity List and restricting the list to uncompleted tasks, a User is quickly able to see if a requested task has been completed or not and take appropriate action. Practically, the need to use the Recipient Activity List can be frequent. When speaking to a customer, for example, who wants to know if the information or product or refund they requested from the User has been acted upon, the User can give a precise answer by reference to the Recipient Activity List. There is no need to put the customer on hold while some other person is called or, even worse, have to tell the customer that after looking into the matter, he/she will be contacted. If precise information is needed as to when the task was performed, a list of Completed Activities (by Recipient or Sender) can be called up and consulted.

Other imaginative and creative uses of the invention will occur to those skilled in the art such that the invention is not limited to the specific examples used above to illustrate and explain the essentials the invention and its various possible embodiments, except as specifically set forth in the following claims.

What is claimed is:

1. A computer-readable medium for causing a computer to function as a contact and activity manager, comprising;
   a computer program stored on the computer-readable medium;
   said computer program having an interface for accessing a database of subject records containing subject information about a plurality of subjects;
   said computer program having an interface for accessing a database of activity records, said activity records containing data describing human-assisted activities that have taken place or are scheduled to take place in the future wherein at least some of said activity records are linked to a said subject record;
   said computer program having an interface for accessing a database of topic records wherein each said topic record contains information about a designated topic and is linked to and identifies a set of said activity records;
   said computer program having a processing module for selecting all said activity records linked to a subject record; and
   said computer program having a processing module for selecting all said activity records linked to a topic record.

2. The computer-readable medium of claim 1 wherein said activity information is both structured and unstructured.

3. The computer-readable medium of claim 1 wherein said subject information is both structured and unstructured, said activity information is both structured and unstructured, and said topic information is both structured and unstructured.

4. The computer-readable medium of claim 3 wherein said activity information may include material about telephone calls, fax communications, mail communications, personal visits and comments.

5. The computer-readable medium of claim 4 wherein said activity information may include the following additional material: identification of a sender authoring the activity record, identification of a recipient to whom the activity record is directed, a calendar date for completion of the activity, a description of the activity and whether the activity has been completed.

6. The computer-readable medium of claim 5 wherein said computer program is further described as having a processing module for selecting all activity records directed to a particular recipient.

7. The computer-readable medium of claim 6 wherein said computer program is further described as having a processing module for selecting all said activity records directed to a particular recipient and not indicated as completed.

8. The computer-readable medium of claim 6 wherein said computer program is further described as having a processing module for selecting all said activity records created by a particular sender.

9. The computer-readable medium of claim 8 wherein said computer program is further described as having a processing module for selecting all said activity records created by a particular sender and not indicated as completed.

10. The computer-readable medium of claim 1 wherein said activity information may include material about telephone calls, fax communications, mail communications, personal visits and comments.

11. The computer-readable medium of claim 10 wherein said activity information may include the following additional material: identification of a sender creating the activity record, identification of a recipient to whom the activity record is directed, a calendar date for completion of the activity, a description of the activity and whether the activity has been completed.

12. The computer-readable medium of claim 1 wherein each said topic record contains information about a designated topic.

13. The computer-readable medium of claim 12 further comprising:
    said computer program having a processing module for selecting all said activity records linked to a said subject record; and
    said computer program having a processing module for selecting all said activity records linked to a said topic record.

14. A computer-readable medium for causing a computer having a display screen to function as a contact and activity manager, comprising;
    a computer program stored on the computer-readable medium;

said computer program having an interface for creating and accessing a database of subject records containing subject information about a plurality of subjects and selectively displaying said subject records on the screen;

said computer program having an interface for creating and accessing a database of activity records, said activity records containing data describing human-assisted activities that have taken place or are scheduled to take place in the future wherein at least some of said activity records are linked to a said subject record and selectively displaying said activity records on the screen;

said computer program having an interface for creating and accessing a database of topic records wherein each said topic record contains information about a designated topic and is linked to and identifies a set of said activity records and selectively displaying said topic records on the screen;

said computer program having a processing module for selecting and displaying on the screen said activity records linked to a subject record; and said computer program having a processing module for selecting and displaying on the screen said activity records linked to a topic record;

said computer program having an interface for creating and displaying on the screen an identifying list of said activity records linked to a specified said topic record;

said computer program having an interface for creating and displaying on the screen an identifying list of said activity records linked to a specific said subject record;

said computer program having a processing module for accessing a said activity record from said displayed identifying list of said activity records linked to a said subject record; and said computer program having a processing module for accessing a said activity record from said displayed identifying list of said activity records linked to a topic record.

15. The computer-readable medium of claim 14 further comprising:

a said activity record includes identification of any said subject record to which said activity record is linked and any said topic records to which it is linked; and said computer program having a processing module for accessing a said subject record identified on a said activity record; and said computer program having a processing module for accessing a said topic record identified on a said activity record.

16. The computer-readable medium of claim 15 further comprising:

said activity records include the identification of at least one person and an indication if the activity has been completed or not;

said computer program having a processing module for selecting from said activity records and displaying on the screen a listing of said activity records identifying the same person.

17. The computer-readable medium of claim 16 further comprising:

said computer program having a processing module for selecting from said activity records and displaying on the screen a listing of said activity records identifying the same person and indicated as not completed.

18. The computer-readable medium of claim 17 further comprising:

said activity records include an indication of a date;

said computer program having a processing module for selecting from said activity records and displaying on the screen a listing of said activity records identifying the same person, having the same indicated date and indicated as not completed.

19. The computer-readable medium of claim 16 further comprising:

said activity records include the identification of a person as the one who created said activity record and a person as the one to whom said activity record is directed.

20. The computer-readable medium of claim 19 further comprising:

said activity records include the identification of a person as the one who created said activity record and a person as the one to whom said activity record is directed; and said computer program having a processing module for selecting from said activity records and displaying on the screen a listing of said activity records identifying the same person, having the same indicated date and indicated as not completed.

21. The computer-readable medium of claim 16 further comprising:

said computer program having a processing module for selecting from the listing of said activity records identifying the same person one of said listed activity records and displaying said activity record on the screen.

22. The computer-readable medium of claim 15 further comprising:

said computer program having a processing module for selecting from said activity records and displaying on the screen a listing of said activity records indicated as not completed.

23. The computer-readable medium of claim 14 wherein each said topic record contains information about a designated topic.

24. A computer-readable medium for causing a computer to function as a contact and activity manager, comprising;

a computer program stored on the computer-readable medium;

a database of subject records containing subject information about a plurality of subjects;

said computer program having an interface for creating, editing, adding to and deleting a said subject record, and accessing said subject records;

a database of activity records containing dynamic data about a plurality of human-assisted activities wherein at least some of said activity records are linked to a said subject record;

said computer program having an interface for creating, recording and storing said activity records and accessing said database of activity records;

a database of topic records wherein each said topic record contains information about a designated topic and is linked to and identifies a set of said activity records; and said computer program having an interface for creating, editing, deleting and storing a said topic record and for accessing said database of topic records.

25. A computer-readable medium for causing a computer to function as a contact and activity manager, comprising;

a computer program stored on the computer-readable medium;

said computer program having an interface for creating a database of subject records containing subject information about a plurality of subjects;

said computer program having an interface for creating a database of activity records, said activity records containing data describing human-assisted activities that have taken place or are scheduled to take place in the future wherein at least some of said activity records are linked to a said subject record; and said computer program having an interface for creating a database of topic records wherein each said topic record is linked to and identifies a set of said activity records.

* * * * *